United States Patent
Namikawa

[11] Patent Number: 6,094,698
[45] Date of Patent: Jul. 25, 2000

[54] INFORMATION PROCESSING APPARATUS HAVING HOST DEVICE AND OTHER AFFILIATED DEVICES WITH REWRITABLE PROGRAM MEMORY

[75] Inventor: Hirofumi Namikawa, Kameoka, Japan

[73] Assignee: Murata Kikai Kabushiki Kaisha, Kyoto, Japan

[21] Appl. No.: 08/975,109

[22] Filed: Nov. 20, 1997

[30] Foreign Application Priority Data

Nov. 26, 1996 [JP] Japan .................................. 8-315105

[51] Int. Cl.[7] .................................................. G06F 13/00
[52] U.S. Cl. ........................................ 710/74; 711/104
[58] Field of Search ............................. 710/74, 62, 129; 711/103, 104, 154, 105

[56] References Cited

U.S. PATENT DOCUMENTS

| 5,602,738 | 2/1997 | Sasaki | 701/115 |
| 5,687,345 | 11/1997 | Matsubara et al. | 711/103 |
| 5,694,360 | 12/1997 | Iizuka et al. | 365/185.33 |

FOREIGN PATENT DOCUMENTS

| 06103190 | 4/1994 | Japan . |
| 07143271 | 6/1995 | Japan . |

*Primary Examiner*—Xuan M. Thai
*Attorney, Agent, or Firm*—Armonstrong Westerman Hattori McLeland & Naughton

[57] ABSTRACT

In the present invention, an information processing apparatus includes a host device and other external devices connected to the host device. When a memory that has stored a new control program of updated version is installed in the host device, the host device replaces the current control program that is stored in a memory of each external device with the new control program. As rewriting of control programs in the external device can be carried out by simply installing the new memory in the host device, the rewriting operation of control programs of the external devices becomes very simple. The present invention is especially effective when a plurality of the external devices is connected to the host device.

20 Claims, 4 Drawing Sheets

INFORMATION PROCESSING APPARATUS HAVING HOST DEVICE AND OTHER AFFILIATED DEVICES WITH REWRITABLE PROGRAM MEMORY

BACKGROUND OF THE INVENTION

1. Technical Field

The present invention relates to a host device for information processing such as a facsimile device or a personal computer and an information processing apparatus having such a host device and other devices that are externally affiliated to the host device.

2. Background Art

With the recent development of an information society, the ways information processing devices are used have increased greatly. However, realizing a single information processing device that is able to cope with all such demands would be expensive. Accordingly, various external devices are connected as necessary to a host device that is provided with basic functions.

If a facsimile is used as an example of a host device, a modem for use with multiple lines, a scanner or a printer or the like are all examples of affiliated external devices.

Each of the host device and the affiliated external devices in such a system as above is provided with a memory that stores a control program. The host device as well as each of the affiliated external devices is operated according to the program that is stored in its own memory. When the control program is to be subject to a "version-up", generally a service person manually replaces the memory provided in each information processing device (that is, each of the host device and the external devices) with a new memory that has stored a new control program of the updated version. Or, if a rewritable flash memory is used as the program memory, the control program data in the flash memory can be replaced with a new version data by transferring the new control program data from a service center through a public telephone network and rewriting the new program into the flash memory.

However, the manual exchange of memory in the host and external devices by a service person is quite troublesome and it is especially the case when a number of external devices are connected to the host device. The latter method of rewriting the flash memory through the public phone network or the like may be less troublesome than the manual exchange, but even this method has a serious shortcoming that transmission errors of the program data may occur and thus reliable rewriting is not always assured.

SUMMARY OF THE INVENTION

In order to solve the problems stated above, the present invention proposes an information processing apparatus having a host device and other affiliated devices in which easy and reliable rewriting of a program memory is possible for each of the constituent device (the host device and its affiliated external devices).

As a first aspect of the present invention, a host device for processing information includes connection means for connecting an external device having a first memory unit for storing a rewritable control program, and transfer means for transferring a control program data to the first memory unit of the external device through the connection means.

According to the first aspect of the present invention, a new control program data of a new version can be transferred from the host device to the first memory unit of the external device through the connection means. Therefore, if a plurality of the external devices are connected to the host device, "version-up" of the program memory of each device can easily and reliably be performed without manually exchanging the first memory unit in each external device.

A second aspect of the present invention, the host device for processing information includes connection means for connecting an external device having a rewritable first memory unit, an installation part for installing a second memory unit that has stored a new control program data, transfer means for transferring the data that is stored in the second memory unit in the installation part to the first memory unit of the external device through the connection means.

According to the second aspect of the present invention, the control program data that is stored in the second memory unit in the installation part of the host device is transferred to the first memory unit of the external device through the connection means. Therefore, if each control program stored in each first memory unit of a plurality of the external devices needs to be rewritten, all such rewriting can be easily performed by simply installing the second memory unit that has stored the new control program data in the installation part of the host device.

As a third aspect of the present invention, an information processing apparatus includes a host device and a plurality of external devices that are connected to the host device. Each of the host device and the external devices is provided with a rewritable first memory unit for storing a control program. The host device has an installation part for removably installing a second memory unit that has stored a control program, and transfer means for transferring the program that is stored in the second memory unit in the installation part to the first memory unit of the host device or the external device.

According to the third aspect of the present invention, the control program data that is stored in the second memory unit in the installation part of the host device is transferred to the fist memory unit of the host device and/or the external devices. Therefore, all rewriting of program memory in each device can be easily and reliably performed by simply installing the second memory unit in the installation part of the host device.

Other aspects of the present invention are as follows. The external device is provided with: a third memory unit that is to be read and written into from both directions; and the transfer means transfers the control program by way of the third memory unit. The external device is provided with: a third memory unit that is to be read and written into from both directions; and the transfer means transfers the data by way of the third memory unit. The rewritable first memory unit is a flash memory.

In addition, the connection method by which a plurality of the external devices is connected to the host device is daisy-chain method. The external device includes a rewritable third memory unit that is to be read and written into from both directions, and the transfer means of the host device transfers data to the external device by way of the third memory unit. The third memory unit has an up-load area for storing data that is transferred from the external device toward the host device side and a down-load area for storing data that is transferred from the host device toward the external device side.

Further, the rewritable first memory unit is a flash memory. The host device includes input means for inputting information that represents a transfer destination of the control program, and when the transfer means transfers the control program to the external device, it also transfers information that commands to which device the control program be sent according to the input information that represents the transfer destination. The external device includes first connection means for connecting itself to the host device or another external device that is connected to itself on the host device side. When each external device receives the control programs transferred from the host device or from another external device that is connected to it on the host device side, it determines whether the control program to be written into its first memory unit or to be further transferred to the next external device that is connected to it on the opposite side of the another external device.

Some prior art have proposed transferring the new program from a superior panel to (a plurality of) inferior panels via dual port RAM. However, none of them clearly discloses the installation of a new memory that has stored a new control program in the host (superior) device nor the transfer of the program from this "removably" installed memory to each external (inferior) device via communication lines. As the program rewriting can be carried out, in a sense, by simply installing a new (easily removable) memory in the host device in the present invention, the whole rewriting process becomes significantly simple, easy and reliable.

DESCRIPTION OF THE PREFERRED EMBODIMENTS

Firstly, an embodiment where the present invention is realized as a facsimile device F and an external device Gn that is connected to the facsimile device F will be described with reference to the accompanying drawings.

Figure 1:
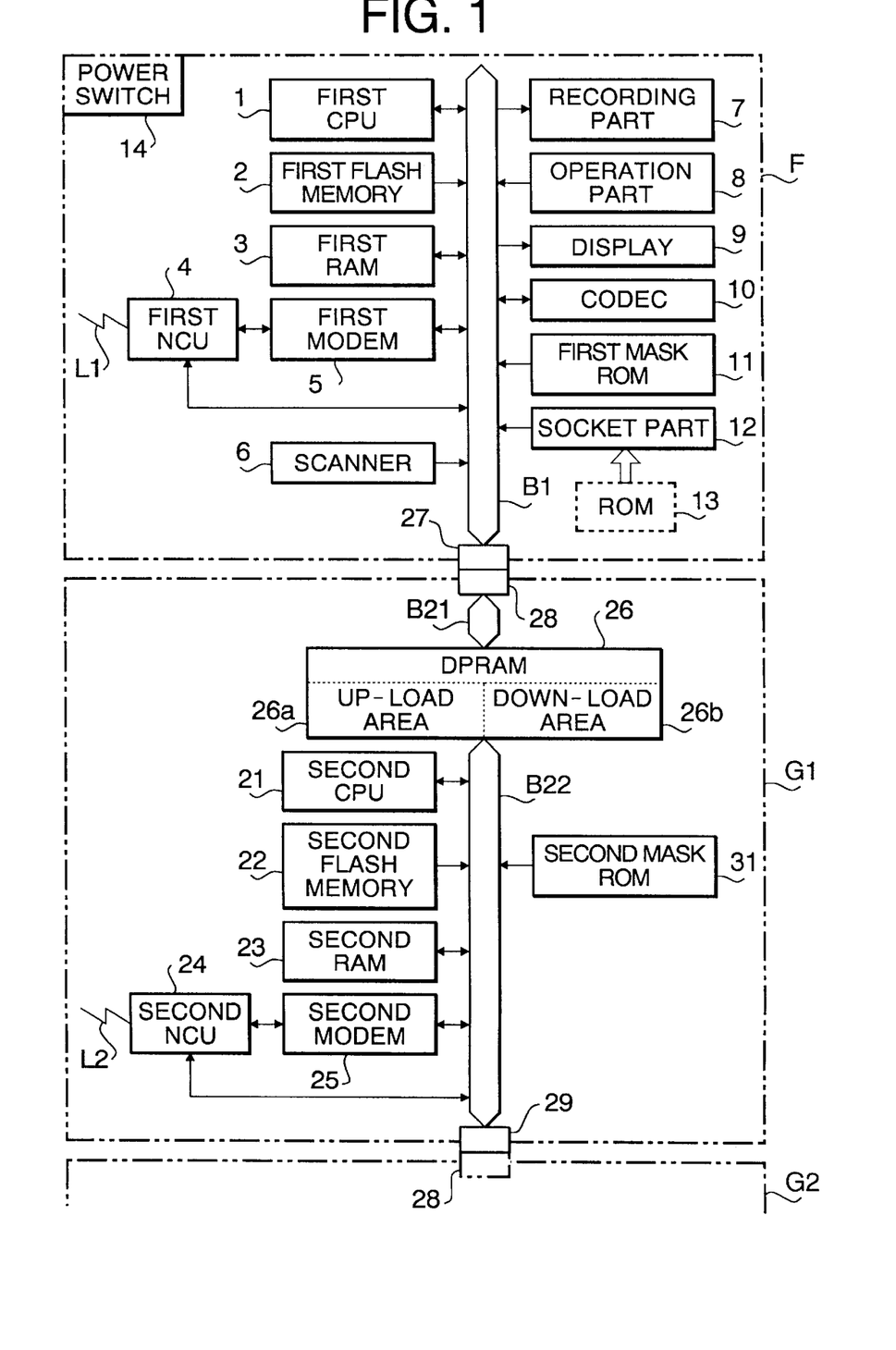
FIG. 1 is a block diagram of the facsimile (host) device and external device according to one embodiment of the present invention.

As shown in FIG. 1, in the present embodiment, an external device G1 having a second telephone line L2 is connected to a facsimile device F having a first telephone line L1. Thus simultaneous communication over the first telephone line L1 of the facsimile device F and the second telephone line L2 of the external device G1 is possible. In short, in the present embodiment, a facsimile device F having one telephone line may be expanded into a two-telephone line facsimile device F by connecting an external device G1 as an option.

Furthermore, another external device G2 may be connected to the external device G1 and yet another external device Gn may be connected to this external device G2. In short, the present embodiment allows the sequential connection to a facsimile device F of a plurality of external devices Gn in a daisy chain format.

Firstly, the facsimile device F having the first telephone line L1 will be described.

A first flash memory as a first memory (Flash Electrically Erasable Programmable Read Only Memory) unit 2 that memorizes the programs and the like for control of the operations of the entire facsimile device F and transfer of data between the facsimile device F and the DRAM 26 (described later) provided in the external device G1, and a first RAM (Random Access Memory) 3 that temporarily memorizes various types of information are connected to a first CPU (Central Processing Unit) 1 via a bus B1. It should be noted that the control program stored in the first flash memory 2 is to carry out the normal processing such communication processing by the facsimile device F.

A first NCU (Network Control Unit) 4 not only controls the connection with the first telephone lines L1 but is also provided with functions that transmit a dial pulse corresponding to a third party's telephone number and that detect a ringing signal.

A first modem 5 carries out modulation/demodulation of the transmission/reception data. Scanner 6 scans an image on a document. Recording part 7 carries out printing on recording paper of the received image data or the image data scanned by the scanner 6. Operation part 8 is provided with various types of operation keys such as dial keys for inputting a telephone number and a start key for starting the facsimile communication procedures.

A display 9 including an LCD (Liquid Crystal Display) or the like is for displaying various types of information. Codec 10 encodes the image scanned by the scanner 6 for transmission. Furthermore, codec 10 decodes the received image data. A first connector 27 is connected to the first CPU 1 via the bus B1 as connection means. This bus B1 has an address bus for transmission of an address signal, a data bus for transmission of data and a control bus for transmission of a signal that controls the first CPU 1 such as an interrupt signal or Busy signal and its (B1's) structure allows full duplex communication.

The facsimile device F further includes a first mask ROM (Read Only Memory) 11. The first Mask ROM 11 stores a program for controlling the data rewriting process that is carried out in the first flash memory 2 and a program for controlling the data transfer between the facsimile (host) device F and a DPRAM 26 that is provided in the external device G1 (the details of DPRAM 26 will be described below).

The facsimile device F also includes a socket part 12 as an installation part. The socket part 12 accommodates a ROM 13 as a second memory unit that has stored a new control program of updated version. A switch 14 is provided for ON/OFF control of the electric power of the facsimile device F.

In the present embodiment, the first CPU 1, the first mask ROM 11, and the first RAM 3 constitute the transfer means of the present invention.

Next, the external device G1 having the second telephone line L2 will be described.

A second flash memory 22 as a first memory unit that memorizes the programs and the like for control of the operations of the entire external device G1 and the reading and writing operations of data into the DPRAM 26 (described later) provided in this external device G1, and a second RAM 23 that temporarily memorizes various types of information are connected to a second CPU 21 via a bus B22.

A second NCU 24 not only controls the connection with the second telephone lines L2 but is also provided with functions that transmit a dial pulse corresponding to a third partiy's telephone number and that detect a ringing signal. A second modem 25 carries out modulation and demodulation of the transmission and reception data.

A DPRAM (Dual Port Random Access Memory) 26 is arranged in the external device G1 as a memory means capable of being read from and written into from both directions. This DPRAM 26 has two memory areas being an up-load area 26a and a down-load area 26b. DPRAM 26 is connected to the second CPU 21 via the bus B22. This bus B22 also has an address bus, data bus and control bus similar to the bus B1 of the facsimile device F and moreover, is also capable of full duplex communication.

A second connector 28 is connected to the DPRAM 26 via the bus B21 as a second connection means. This bus B21 also has an address bus, data bus and control bus similar to bus B1 and bus B22. The second connector 28 and the bus B21 connected to the connector 28 are capable of full duplex communication. Further, due to the connection between the first connector 27 of the facsimile device F and this second connector 28, full duplex communication between the facsimile device F and the external device G1 is possible and external device G1 is controlled by that facsimile device F as an supplementary device of the facsimile device F. Furthermore, the external device G1 is provided with a third connector 29 as a third connection means for connection to another external device G2. This third connector 29 connects to the second CPU 21 via a bus B22. This third connector 29 is also capable of full duplex communication.

It should be noted that the external device G2 is also provided with a second connector 28, third connector 29 and DPRAM 26 similar to the aforementioned external device G1. For example, if the external device G2 is a scanner (unit), a scanner part for scanning an image may be arranged instead of the second NCU 24 and second modem 25 in the external device G1. Also, full duplex communication between both external devices G1, G2 is possible by the connection of the second connector 28 of this external device G2 with the third connector 29 of the external device G1. Thus thereafter, various types of external devices can be sequentially connected to the terminal external device.

The aforementioned up-load area 26a in the DPRAM 26 is the area for memorizing the data to be transferred from the external device Gn to the facsimile device F and the aforementioned down-load area 26b in the DPRAM 26 is the area for memorizing the data to be transferred from the facsimile device F to the external device Gn. Communication between the facsimile device F and the external device G1 is carried out via the DPRAM 26. Either the first CPU 1 of the facsimile device F or the second CPU 21 of the external device Gn operates by writing the information to be conveyed to the other in this DPRAM 26 and reading the information written by the other. In real terms, the facsimile device F reads the data in the up-load area 26a of the DPRAM 26 of the external device G1 and writes data into the down-load area 26b. The external device G1 reads the data in the down-load area 26b of the external device G1 and writes data into the up-load area 26a of the external device G1. As a result, communication is performed between the facsimile device F and the external device G1. It should be noted that the first external device G1 directly connected to the facsimile device F reads data from the up-load area 26a of the DPRAM 26 of the secondly connected external device G2 and writes data into the down-load area 26b of the same device G2.

The second mask ROM 31 stores a program for controlling the data rewriting process in the second flash memory 22 and a program for controlling the data transfer between the other external device Gn that is connected to the external device G1 and the facsimile device F through DPRAM 26.

Next, the internal structures of the up-load area 26a and the down-load area 26b of DPRAM 26 will be described.

Each internal part of the up-load area 26a and down-load area 26b in the DPRAM 26 is arranged with management areas and data areas. The data area is an area for memorizing the actual data. The management area stores information relating to the actual data in the data area. This management area includes a status area, stack number area and the like.

The status area stores information showing the state of the data area. The stack number area stores a stack number for determining whether or not the data in the data area is meant for itself.

Next, the actions of the present embodiment will be described.

As described above, in the present embodiment the facsimile device F can be sequentially connected to a plurality of external devices Gn in a daisy chain format. In this kind of construction, when the facsimile device F reads the data in the up-load area 26a of the DPRAM 26 in the external device G1 directly connected the same device F, in short, when the facsimile device F reads the data transferred from the external device Gn, it F needs to determine which external device Gn is the transmission source of that data. Conversely, when the facsimile device F writes data into the down-load area 26b of the DPRAM 26 of the aforementioned external device G1, in short, when the facsimile device F transfers data to the external device Gn, the facsimile device F needs to state the destination device (the external device Gn to which that data is addressed) in that data.

On the other hand, when each external device Gn reads the data written into the down-load area 26b of its own DPRAM 26, in short when it reads the data transferred from the facsimile device F, the external device Gn needs to determine whether that data is addressed to itself or not. Also, when each external device Gn writes data into the up-load area 26a of its own DPRAM 26, in short when each external device Gn transfers data to the facsimile device F, it needs to express in that data that itself is the transmission source of that data.

In order to satisfy the above requirements, the present embodiment performs the following operations. It should be understood that, as shown in FIG. 2, a plurality of external devices G1–Gn are now connected to the facsimile device F.

Figure 2:
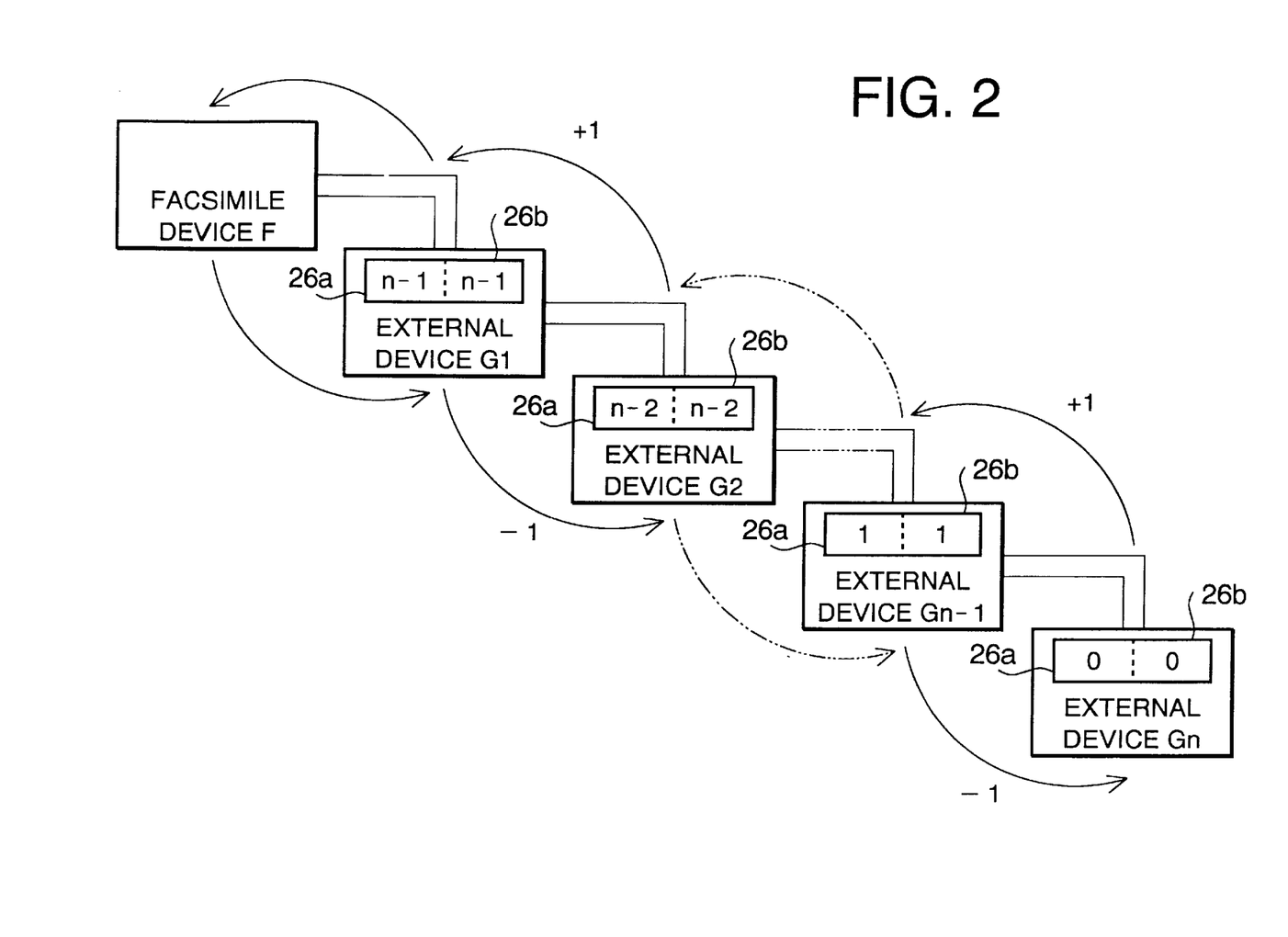
FIG. 2 is an explanatory diagram for describing the data transfer operation between the facsimile device and a plurality of the external devices.

As shown in FIG. 2, in the case where the facsimile device F transfers data to an external device Gn (the n'th external device from the facsimile device F) as the data transfer destination, when data is written into the down-load area 26b of DPRAM 26 in the firstly connected external device G1, a "n-1" is written into the stack number area of the same down-load area 26b as a stack number. When the first external device G1 reads the data in the down-load area 26b of its own, if the stack number in the stack number area in the same down-load area 26b is "0", it G1 determines that the data in its down-load area 26b is addressed to itself. However, as the stack number in its stack number area is "n-1" in the case above, the first external device G1 determines that the data in its down-load area 26b is addressed to another external device. Thus, the external device G1 writes the read data in the down-load area 26b of DPRAM 26 in the external device G2 that is connected on the down-load side of the external device G1 (in this situation, the facsimile device F is connected on the up-load side of the external device G1). At that time, the external device G1 writes a "n-2" being a value decremented from the read stack number "n-1" by "1", into the stack number area of the down-load area 26b of the external device G2.

Accordingly, while data transmitted from a facsimile device F is transferred to the last external device Gn as the destination via a plurality of other external devices Gn, the stack number written in the stack number area of the down-load area 26b of each external device is decremented by "1" each time. Thus "0" is written in the stack number area of the down-load area 26b at the n'th external device Gn as a stack number. Accordingly, when the n'th external device Gn reads the data in the down-load area 26b of its own, it Gn recognizes based on the stack number "0" that the data in its down-load area 26b is addressed to itself.

Conversely, in the case where, for example, one of the external device Gn (the n'th external device from the facsimile device F) transfers data to the facsimile device F, when the external device Gn writes data into the up-load area 26a of its own DPRAM 26, "0" is written into the stack number area of that same up-load area 26a as a stack number. When the external device Gn-1 that is connected on the up-load side (on the facsimile device F side) of the external device Gn reads the data in the up-load area 26a of the external device Gn, it Gn-1 writes the read data into the up-load area 26a of its own DPRAM 26. At this time, the external device Gn-1 writes "1" (the value incremented by "1" from the previously read stack number "0") in the stack number area of its own up-load area 26a.

Thus while data transmitted from one external device Gn is transferred to the facsimile device F via a plurality of other external devices Gn, the stack number written in the stack number area of the up-load area 26a of each external device Gn is incremented by "1" each time. Thus "n-1" is written as a stack number in the stack number area of the up-load area 26a of the external device G1 that is directly connected to the facsimile device F. Accordingly, when the facsimile device F reads the data written in the up-load area 26a of the external device G1, it recognizes that the transmission souse of the data is the external device Gn that is the n'th external device from itself based on the stack number "n-1".

Due to the above described operations, the external device Gn is able to easily and reliably recognize whether the data is addressed to itself from the facsimile device F or the data is intended to be sent to another external device from the facsimile device F. Furthermore, the facsimile device F is able to reliably and easily recognize, when data is sent from an external device to itself, from which external device Gn the data is sent.

Figure 3:
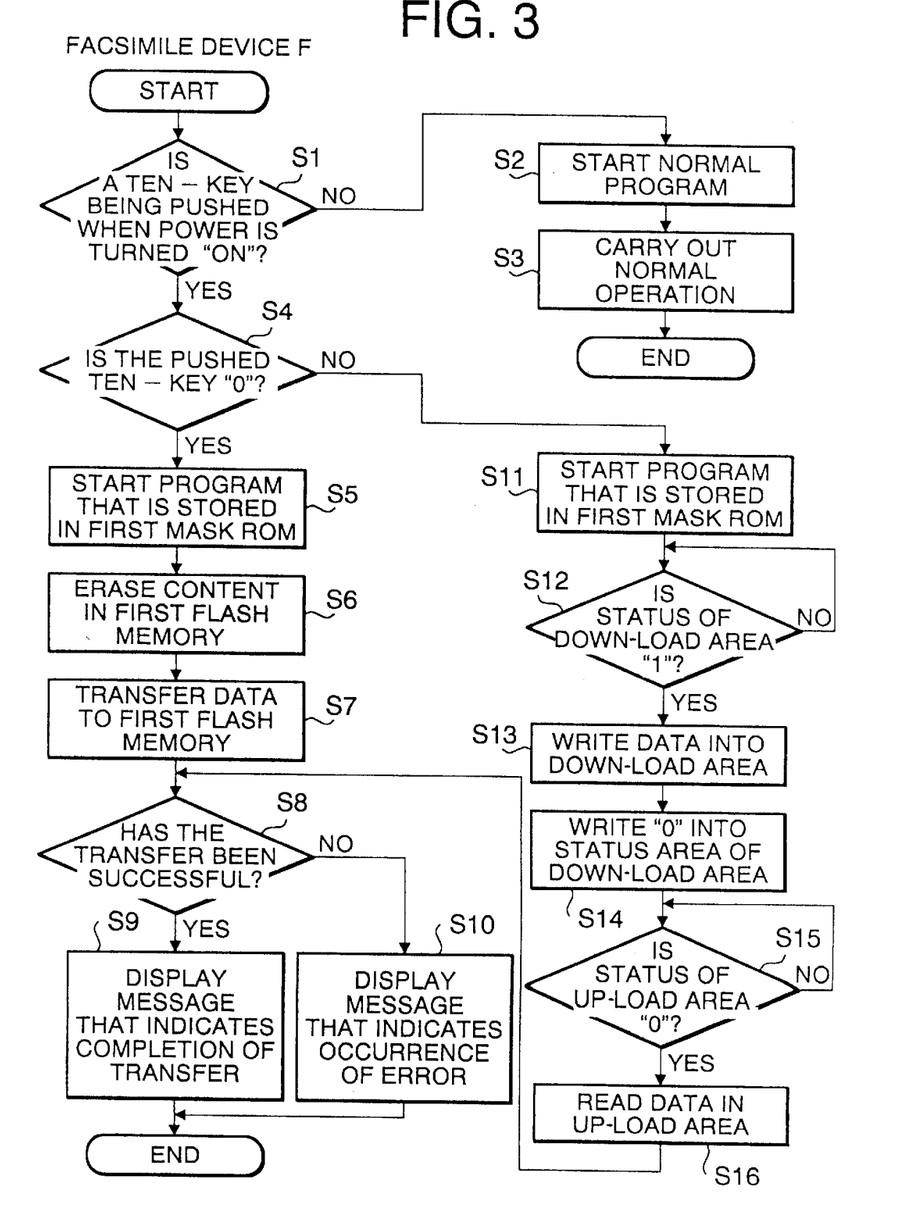
FIG. 3 is a flow chart showing the operations at the facsimile device.
Figure 4:
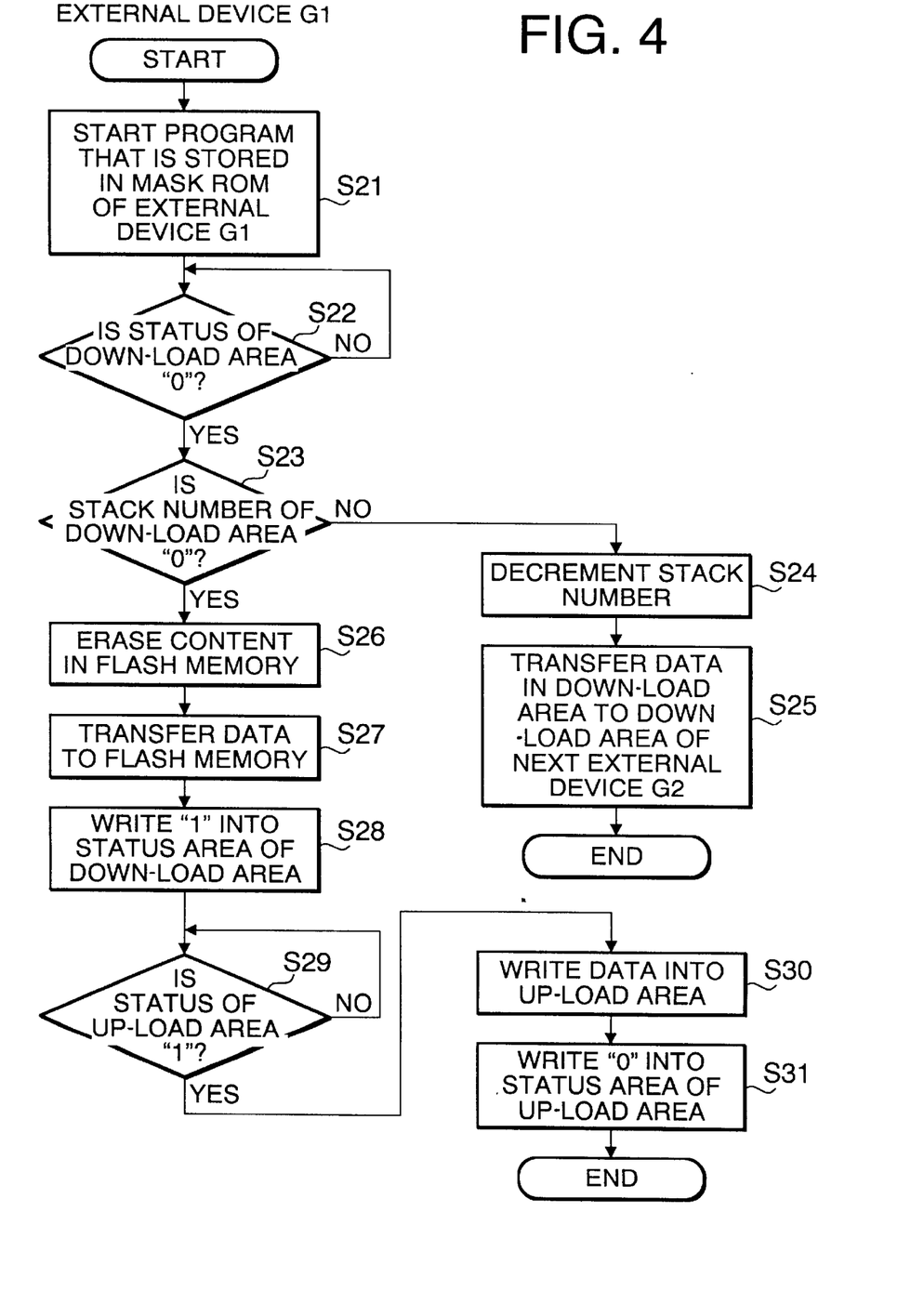
FIG. 4 is a flow chart showing the operations at the external device.

Next, an operation for transferring a program of updated version from the ROM 13 (the ROM 13 storing the updated program is installed in the socket part 12 of the facsimile device F) to the first flash memory 2 of the facsimile device F or the second flash memory 22 of the external device G1–Gn will be described. The flow chart of FIG. 3 shows the operations performed at the facsimile device F. The flow chart of FIG. 4 shows the operations performed at the external device G1. It should be noted that the operations (flow chart) shown in FIG. 3 and that shown in FIG. 4 proceed in parallel.

First, when the power switch 14 of the facsimile device F is turned on, whether or not any ten-key of the operation part 8 is being pushed at this "ON" state (S1). If no ten-key is being pushed, the normal program stored in the first flash memory 2 is started (S2) and a normal operation is carried out (S3). At this time, the normal program stored in the second flash memory 22 of each external device Gn is also started and a normal operation is carried out at each external device Gn as well. At the step S1 described above, when it is determined that a ten-key is being pushed at the "ON" state of the power source 14, whether the ten-key is "0" or not is then determined (S4). If the ten-key that is being pushed is "0", a program stored in the first mask ROM 11 is started (S5) and a process for rewriting the program that is stored in the first flash memory 2 of the facsimile device F is started.

More specifically, the content of the first flash memory 2 is erased at first (S6). Then, the new program data of updated version that is stored in the ROM 13 installed in the socket 12 is transferred to the first flash memory 2 (S7).

At the next step, whether the program data has been successfully transferred or not is determined (S8). When the program data has been successfully transferred, a message such as "The rewriting of the program has been successfully completed." is displayed at the display part 9 (S9) and the processing is terminated. When the program data has not been successfully transferred, a message such as "Errors have occurred in the rewriting" is displayed at the display part 9 and the processing is terminated.

At the step S4 described above, if the ten-key that is being pushed is not "0", a program stored in the first mask ROM 11 is started (S11) and a process for rewriting the program stored in the second flash memory 22 of the external device G1 is started.

More specifically, the process is halted until the status area of the down-load area 26b of DPRAM 26 in the external device G1 becomes "1" (S12). That is, whether the data may be written into the down-load area 26b or not is determined based on if the status area is "1" or not.

When the status area of the down-load area 26b becomes "1", the program data that is stored in the ROM 13 is written into the data area of the down-load area 26b and a value that has been decremented by "1" from the ten-key number that was pushed at S1 is written as a stack number in the stack number area (S13). For example, when the ten-key "2" was pushed (this means that the data address is the external device G2), a value that is obtained by decrementing the value "2" by "1" (that is, "1") is written in the stack number. In short, the data address can be selected by the ten-key number that is pushed. Herein, the ten-key number n coincides with the connection order (n'th) of the external device Gn to which the data is addressed ("n'th" means that the external device is the n'th external device from the facsimile device F).

In continuance, "0" is written into the status area of the down-load area 26b of the external device G1 such that the completion of data writing into the data area of the down-load area 26b can be noticed (S14). That is, "0" in the status area of the down-load area 26b represents that the data in the data area is valid and to be maintained. At this time, an interruption signal is input from the facsimile device F to the second CPU 21 of the external device G1 via the DPRAM 26. The program that is stored in the second mask ROM 31 of the external device G1 is started based on this interruption signal.

Then, the external device G1 writes the program data in the down-load area 26b into the second flash memory 22 and stores the new data in the memory 22 when the stack number in the stack number area of its down-load area 26b is "0". Conversely, when the stack number is not "0" in the stack number area of its down-load area 26b, the external device G1 transfers the program data in the down-load area 26b to the external device G2. The operations that are carried out in the external device G1 will be described in detail below.

Next, the process is halted until the status area of the up-load area 26a becomes "0" (S15). More specifically, when the data rewriting at the external device Gn is complete, information representing the rewriting result of the program data is sequentially transferred from the external device Gn to the facsimile device F. This rewriting result is eventually written into the up-load area 26a of the external device G1. The, the status area showing the data state in the data area is replaced with "0" according to the information that represents the rewriting result.

When the status area of the up-load area 26a is rewritten into "0", the data in the data area of the up-load area 26a (the information data representing the rewriting result of the program data) is read by the facsimile device F (S16). The process then jumps to the process at S8 described above, and whether the program data has been successfully transferred or not is determined as in S8.

Next, the operations that are carried out in the external device G1 will be described with reference to the flow chart shown in FIG. 4.

When an interruption signal is input to the CPU 21 of the external device G1 from the facsimile device F via DPRAM 26 (the external device G1 is directly connected to the facsimile device F), the program that is stored in the second mask ROM 31 is started (S21). Then, after the status area of the down-load area 26b of DPRAM 26 is confirmed to be "0" (S22), whether the stack number of the stack number area is "0" or not is determined (S23). If the stack number is not "0", it is determined that the data is not addressed to itself (that is, the external device G1) and the stack number is decremented by "1" (S24). The data in the down-load area 26b is then transferred to the down-load area 26b of the second external device G2 (S25) and the process is completed. At this time, an interruption signal from the external device G1 is input to the CPU of the external device G2. It should be noted that the operation that is similar to the flow chart shown in FIG. 4 is carried out at each of other external devices on the down stream side (G2, . . . Gn).

If the stack number is "0", it is determined that the data is addressed to itself (that is, the external device G1) and the content of the second flash memory 22 of the external device G1 is erased (S26). Then, the program data that is stored in the data area of the down-load area 26b is transferred to the second flash memory 22 (S27). After this transfer of program data, "1" is written into the status area of the down-load area 26b so that the down-load area 26b be made free (rewritable) (S28).

Next, after the status area of the up-load area 26a is confirmed to be "1" (S29), the transfer result of the program data is written into the data area of the up-load area 26a (S30). At this time, "0" is written in the stack number area of the up-load area 26a, so that the transfer source of the data can be shown.

Then, "0" is written into the status area of the up-load area 26a such that it can be shown that the data in the data area is valid and to be preserved (S31), and the process is completed. At this time, an interruption signal is output from the external device G1 to the first CPU 1 of the facsimile device F. The operations that include S15 and other steps after S15 (shown in FIG. 3) are carried out at the facsimile device F based on this interruption signal.

The present embodiment described above demonstrates following effects.

(1) The facsimile device F as a host device includes a socket part 12 for installing the ROM 13 that has stored a control program of updated version. The control program that is stored in the ROM 13 installed in the socket 12 is transferred to the first flash memory 2 of the facsimile device F and the second flash memory 22 of each of a plurality of the external devices Gn connected to the facsimile device F by daisy-chain method. Therefore, (even) when a plurality of the external devices Gn is connected to the facsimile device F, the program content of the first flash memory 2 and the second flash memory 22 of the facsimile device F and each external device Gn can be easily and reliably rewritten by simply installing the ROM 13 in the socket part 12 of the facsimile device F.

(2) There writing process of the program can be easily started by simply installing the ROM 13 (that has stored a new program) in the socket part 12 and pushing a ten-key when the power source is turned "ON". Due to this, no special keys or switches that are exclusively used for starting the rewriting process of the program are not needed. In addition, the device of which program to be rewritten can be easily selected by pushing a ten-key number (the number is to coincide with the aimed device number) simultaneous with the turning "ON" of the facsimile device F. Herein, there is much less possibility of selecting a wrong device as a device of which program to be rewritten.

(3) In the rewriting process of the program, the facsimile device F and the external device Gn determine the destination device to which the new program be addressed based on the ten-key number that has been pushed. The facsimile device F carries out the program rewriting of its own first flash memory 2 if the new program is addressed to itself. If the program is addressed to an external device Gn, the facsimile device F transfers to the external device G1 that is directly (first) connected to it the new program data with a stack number addressing the destination device (the external device Gn as the transfer destination). On the other hand, the external device Gn determines whether the received program is addressed to itself or not based on the received stack number. If the program is determined to be addressed to itself, the external device Gn rewrites the program in its second flash memory 22. If the program is determined to be not addressed to itself, the external device Gn transfers the program to the next external device Gn. As this operation is repeated at each external device, the new program can be reliably transferred to each external device Gn that is connected to the facsimile device F by the daisy-chain method.

(4) The result of the program-rewriting is displayed at the display part 9 of the facsimile device F. Due to this, whether the rewriting of the program has been successfully carried out or not can be reliably confirmed.

(5) A plurality of the external device Gn can be connected to the facsimile device F by the daisy-chain method if a connector is provided to the facsimile device F. As a result, another new external device can be easily added to the system by simply connecting that new external device to the last external device Gn. Thus, the arrangement of the whole system having the facsimile device F as the host device becomes simple and can be easily modified. In addition, the data transfer from the facsimile device F to the external device Gn and the data transfer from the external device Gn to the facsimile device F are each carried out DPRAM 26 provided in each external device Gn. Due to this, the data transfer between the external device Gn and the facsimile device F can be easily and effectively carried out regardless of the number of connected external devices Gn.

(6) At each external device Gn, DPRAM 26, the two connectors 28, 29 and the software for data transfer can be commonly shared. Therefore, each external device Gn, no matter at which order it is connected to the facsimile device F, is always able to determine whether the received data is addressed to itself or not based on the received stack number (precisely, whether the stack number is "0" or not). As a result, not a few components can be shared by each external device Gn, reducing the cost at each external device Gn.

It should be noted that the embodiment described above may be realized with modifications as follows. Similar functions and effects to those in the aforementioned embodiment can also be achieved in such modifications.

(a) A printer or scanner or any such device may be prepared as an external device to be connected to the facsimile device F. For example, if the external device is a printer, a recording part may be arranged in place of the second NCU 24 and second modem 25 in the external device G1 shown in FIG. 1. If this kind of external device is connected, the image data received by the facsimile device F may be transferred to this external device and printed out there. Furthermore, if an external device is a scanner, a scanning part may be arranged in place of the second NCU 24 and second modem 25 in the external device G1 shown in FIG. 1. If this kind of external device is connected, the image data scanned by the external device may be transferred to the facsimile device F and transmitted from that device F.

(b) On the aforementioned present embodiment, the stack number is incremented and decremented by "1" at a time but this may be incremented and decremented by two or more. Furthermore, when an external device starts the transfer of data from itself to the facsimile device F, the stack number normally starts at "0" but this starting value may be set at a value other than "0". Corresponding to this, the external device sets the value of the stack number that determines that the data is addressed to itself, to a value other than "0".

(c) A change may be carried out such that the stack number is incremented when data is transferred from the facsimile device F to the external device and the stack number is decremented when data is transferred from the external device to the facsimile device F.

(d) The DPRAM 26 may be changed to a first FIFO (First In First Out) memory that transfers the data from the first CPU 11 to the second CPU 21, and to a second FIFO memory that transfers data from the second CPU 21 to the first CPU 11.

(e) The external device does not have to be external but may be arranged inside the facsimile device.

(f) The information processing device is not limited to a facsimile device F but may be applied to any device such as a personal computer or the like.

(g) When a ten-key is pushed at the turning "ON" of the power source for selecting the transfer destination of the program, "#" key may also be pushed. By operating two different keys like this, troubles that would be caused by pushing a ten-key by mistake at the turning "ON" of the power source may be prevented. The combination of the keys is not limited to "#" and a figure, but a combination of "*" and a figure or a combination of "#" and "*" and a figure may also be possible.

(h) In the aforementioned embodiment, the data transfer to the external device Gn is carried out by installing the ROM 13 of updated version in the socket part 12 of the facsimile device F and transferring the new program in the ROM 13 to each device. However, the socket part 12 may be provided at any of the external devices Gn such that the data transfer be carried out from that external device Gn to the facsimile device F or other external device Gn.

(i) The result of the data transfer may be notified with a LED or a buzzer.

Further, some technological idea of the present invention other than that can be understood from the aforementioned embodiment will be described below with their possible functions and effects.

(1) The external device connected to the host device may include a rewritable first memory unit for storing the control program, and rewriting means for writing the control program transferred from the host device into the first memory unit. The rewriting means may be the CPU and the mask ROM of each device.

(2) When one external device transfers the data from another external device to the host device or yet another device on the host device side, a predetermined number may be added to the stack number that is transferred with the data. Conversely, when the one external device transfers the data from the host device side device to another external device, a predetermined number may be subtracted from the stack number that is transferred with the data.

(3) As the storage media that stores the program for operating each component of the aforementioned information system, any medium that is capable of storing computer programs (such as a semiconductor memory unit that is to be read, a storage medium of a electromagnetic memory device, a storage medium of a photomagnetic memory device) may be employed. More specifically, such media may include a floppy disc, a hard disc, a photodisc, a photomagnetic disc, a change-of-phase disc, a magnetic disc.

What is claimed is:

1. A host device for information processing comprising:
connection means for connecting an external device to the host device, the external device having a rewritable first memory unit;
an installation part for installing a second memory unit that has stored a data; and
transfer means for transferring the data that is stored in the second memory unit installed in the installation part to the first memory unit of the external device by way of the connection means,
wherein the external device is provided with a third memory unit that is to be read and written into from both directions.

2. The host device of claim 1, wherein the transfer means transfers the control program by way of the third memory unit.

3. The host device of claim 1, wherein the external device is provided with a third memory unit that is to be read and written into from both directions, and the transfer means transfers the data by way of the third memory unit.

4. The host device of any of claims 1 to 3, wherein the rewritable first memory unit is a flash memory.

5. An information processing apparatus having a host device and external devices, the external devices being externally connected to the host device, comprising:
means for allowing the host device to be connected to a plurality of the external devices;
a rewritable first memory unit for storing control programs, the first memory unit being provided to each of the host device and the external devices;

an installation part provided in the host device for removably installing a second memory unit that has stored control programs; and transfer means provided in the host device for transferring the control programs that is stored in the second memory unit installed in the installation part to the first memory unit of each of the host device and the external devices.

6. The information processing apparatus of claim 5, wherein a connection method by which a plurality of the external devices are connected to the host device is a daisy-chain method.

7. The information processing apparatus of claim 5 or 6, wherein the external device includes a rewritable third memory unit that is to be read and written into from both directions, and the transfer means of the host device transfers data to the external device by way of the third memory unit.

8. The information processing apparatus of claim 7, wherein the third memory unit has an up-load area for storing data that is transferred from the external device toward the host device side and a down-load area for storing data that is transferred from the host device toward the external device side.

9. The information processing apparatus of claim 5 or 6, wherein the rewritable first memory unit is a flash memory.

10. The information processing apparatus of claim 7, wherein the rewritable first memory unit is a flash memory.

11. The information processing apparatus of claim 8, wherein the rewritable first memory unit is a flash memory.

12. The information processing apparatus of claim 6, wherein the host device includes input means for inputting information that represents a transfer destination of the control program, and when the transfer means transfers the control program to the external device, it also transfers information that commands to which device the control program be sent according to the information that has been input by the input means.

13. The information processing apparatus of claim 6, wherein the external device includes first connection means for connecting itself to the host device or another external device that is next to itself on the host device side, and second connection means for connecting itself to yet another external device that is next to itself on the opposite side of the host device.

14. The information processing apparatus of claim 7, wherein the external device includes first connection means for connecting itself to the host device or another external device that is next to itself on the host device side, and second connection means for connecting itself to yet another external device that is next to itself on the opposite side of the host device.

15. The information processing apparatus of claim 8, wherein the external device includes first connection means for connecting itself to the host device or another external device that is next to itself on the host device side, and second connection means for connecting itself to yet another external device that is next to itself on the opposite side of the host device.

16. The information processing apparatus of claim 9, wherein the external device includes first connection means for connecting itself to the host device or another external device that is next to itself on the host device side, and second connection means for connecting itself to yet another external device that is next to itself on the opposite side of the host device.

17. The information processing apparatus of claim 10, wherein the external device includes first connection means for connecting itself to the host device or another external device that is next to itself on the host device side, and second connection means for connecting itself to yet another external device that is next to itself on the opposite side of the host device.

18. The information processing apparatus of claim 11, wherein the external device includes first connection means for connecting itself to the host device or another external device that is next to itself on the host device side, and second connection means for connecting itself to yet another external device that is next to itself on the opposite side of the host device.

19. The information processing apparatus of claim 12, wherein the external device includes first connection means for connecting itself to the host device or another external device that is next to itself on the host device side, and second connection means for connecting itself to yet another external device that is next to itself on the opposite side of the host device.

20. The information processing apparatus of claim 12, 13 or 19, wherein, when each external device receives the control programs transferred from the host device or from another external device that is connected to it on the host device side, it determines whether the control program to be written into its first memory unit or to be further transferred to the next external device that is connected to it on the opposite side of the another external device.

* * * * *